United States Patent [19]

Grau

[11] Patent Number: 4,661,701
[45] Date of Patent: Apr. 28, 1987

[54] METHODS AND APPARATUS FOR BOREHOLE-CORRECTED SPECTRAL ANALYSIS OF EARTH FORMATIONS

[75] Inventor: James A. Grau, Danbury, Conn.

[73] Assignee: Schlumberger Technology Corporation, New York, N.Y.

[21] Appl. No.: 756,007

[22] Filed: Jul. 17, 1985

[51] Int. Cl.$^4$ ............................................. G01V 5/10
[52] U.S. Cl. ................................... 250/270; 250/262; 250/256; 376/160
[58] Field of Search ............... 250/270, 262, 269, 256; 376/160, 161, 162, 163, 164, 165, 166; 364/422

[56] References Cited

U.S. PATENT DOCUMENTS

| | | | |
|---|---|---|---|
| 3,246,152 | 4/1966 | Caldwell | 376/165 |
| 3,461,291 | 8/1969 | Goodman | 376/11 |
| 3,521,064 | 7/1970 | Moran et al. | 250/261 |
| 3,546,512 | 12/1970 | Frentrop | 376/109 |
| 4,012,712 | 3/1977 | Nelligan | 340/857 |
| 4,055,763 | 10/1977 | Antkiw | 250/270 |
| 4,078,174 | 3/1978 | Goldman | 376/165 |
| 4,315,417 | 2/1982 | Zarudiansky | 62/514 R |
| 4,355,310 | 10/1982 | Belaigues et al. | 340/858 |
| 4,390,783 | 6/1983 | Grau | 250/270 |
| 4,394,574 | 7/1983 | Grau et al. | 250/262 |
| 4,464,569 | 8/1984 | Flaum | 250/270 |
| 4,507,554 | 3/1985 | Hertzog et al. | 250/270 |
| 4,527,058 | 7/1985 | Smith, Jr. | 250/256 |
| 4,587,424 | 5/1986 | Grau | 250/270 |

OTHER PUBLICATIONS

"In Situ Neutron Capture Spectroscopy of Geological Formations," Grau et al., AIP Conference Proceedings, No. 125, p. 799 (1985).

"Determination of Lithology from Induced-Gamma Ray Spectroscopy," Flaum et al., SPWLA 22nd Annual Logging Symposium Transactions, Paper H, vol. 1, Mexico City (1981).

"Gamma Ray Spectroscopy Tool: Environmental Effects," Schweitzer et al., Paper SPE11144, 57th Annual Fall Technical Conf. of SPE of AIME Sep. 1982.

Primary Examiner—Janice A. Howell
Assistant Examiner—Constantine Hannaher
Attorney, Agent, or Firm—Brumbaugh, Graves, Donohue & Raymond

[57] ABSTRACT

Capture gamma ray spectroscopy measurements of earth formations traversed by a borehole are corrected for the influence thereon of the geometry and constituents of the borehole, thereby affording more accurate measurements of the spectral contributions from the formation elements. A partition factor is determined for each separate homogeneous region in the borehole/formation measurement environment, i.e., the tool, the borehole fluid, the casing (if present), the cement annulus (if present), and the formation, and these factors are plugged into predetermined elemental yield relationships, for the elements for which capture spectral measurements are made, to determine the volumetric fractions of such elements (or minerals containing such elements) in the formation.

30 Claims, 19 Drawing Figures

METHODS AND APPARATUS FOR BOREHOLE-CORRECTED SPECTRAL ANALYSIS OF EARTH FORMATIONS

BACKGROUND OF THE INVENTION

1. Field of the Invention

The present invention relates to capture gamma ray spectroscopy measurements of earth formations traversed by a borehole and, more particularly, to improved methods and apparatus for correcting such measurements for the effects thereon of borehole geometry and constituents.

2. The Prior Art

The measurement of gamma ray energy spectra produced by the capture of thermal-energy neutrons has been shown to be a useful technique to determine the elemental composition of earth formations. To realize the full potential of these measurements, three separate problems must be addressed: (1) each measured gamma ray spectrum must be decomposed into contributions due to individual atomic elements or "elemental yields", (2) the contributions of each elemental yield due to formation elements must be separated from the contributions due to elements within the borehole, and (3) important petrophysical parameters such as porosity, matrix lithology, and water salinity must be derived from the formation elemental yields.

Although the first and third of these problems have been extensively addressed in the prior art, see, for example, U.S. Pat. Nos. 3,521,064 and 4,055,763, the second problem has often been either ignored, treated as a minor perturbation, or treated too simplistically. In fact, however, the measurement sensitivity to borehole constitutents can easily be as large as or even larger than the sensitivity to formation constituents. Moreover, even for a constant borehole geometry, this relative borehole contribution is variable from depth to depth within the borehole depending upon such parameters as borehole and formation salinities and formation porosity. An effect such as this, which is both large and variable, can neither be ignored nor handled in general by a down-hole calibration as has heretofore been the case. One approach to this problem that has been used commercially has been to divide the borehole/formation environment into different regions and to estimate the geometrical effects of each region on the borehole-contribution to the detected gamma ray spectrum. Although affording improved results relative to earlier prior art techniques, this approach does not provide a full solution to the problem inasmuch as it deals only with geometrical effects and does not take into account the influence of such variables as fluid salinity and porosity.

SUMMARY OF THE INVENTION

It is an object of the invention, therefore, to provide a reliable predictive technique for determining borehole effects on capture gamma ray spectroscopy measurements based on known information of the geometry and composition of the borehole/formation measurement environment.

Another object of the invention is to derive information of the contributions to an elemental capture gamma ray measurement from the respective elemental contents of the borehole and the formation.

Still another object of the invention is to provide such a technique which is applicable to a wide variety of borehole and formation conditions and which can accommodate a diversity of tool operating schemes.

It is a further object of the invention to provide a borehole correction technique which permits the separate, and more accurate, treatment of geometrical effects and nuclear physics effects on elemental gamma ray spectroscopy measurements.

A further object of the invention to provide more accurate information of the constituent volume fractions and other parameters of an earth formation, such as sandstone, limestone, dolomite, porosity, etc., from the elemental gamma ray yields of chemical elements included in or relevant to such contituents and parameters.

The foregoing and other objects are attained by the provision, in accordance with the invention, of methods and apparatus for the spectral analysis of earth formations, in which the elemental capture gamma ray yields for various chemical elements of interest in the borehole/formation environment are corrected for borehole effects by use of a model that permits both the spatial and temporal dependencies of the borehole contribution to be taken into account. The model allows each dependency to be evaluated and parameterized independently as separate functions for each of the different regions in the borehole/formation environment, e.g., the logging tool, the borehole fluid, the casing, the cement annulus and the formation. The two functions for each region are then combined into a single partition factor representing the relative potential for elements within that region to contribute to the detected spectrum of gamma rays. The regional partition factors thus developed are utilized in predetermined elemental yield relationships, relating the measured gamma ray yields for the various elements to the content of such elements in borehole and formation constituents, to derive the volume fractions of those constituents in the formation. The partition factor and volume fraction computations may be done in real time, when the necessary external data of borehole and formation parameters are concurrently available, or they may be carried out remotely based on previously recorded data.

BRIEF DESCRIPTION OF THE DRAWINGS

Additional objects and advantages of the invention will become apparent from the following description of illustrative embodiments thereof, taken in conjunction with the accompanying drawings in which:

FIG. 18 is a functional block diagram of circuits for deriving the borehole and formation partition factors and for applying such factors to derive borehole-corrected volume fraction outputs from measured elemental gamma ray yields.

DETAILED DESCRIPTION

Figure 1:
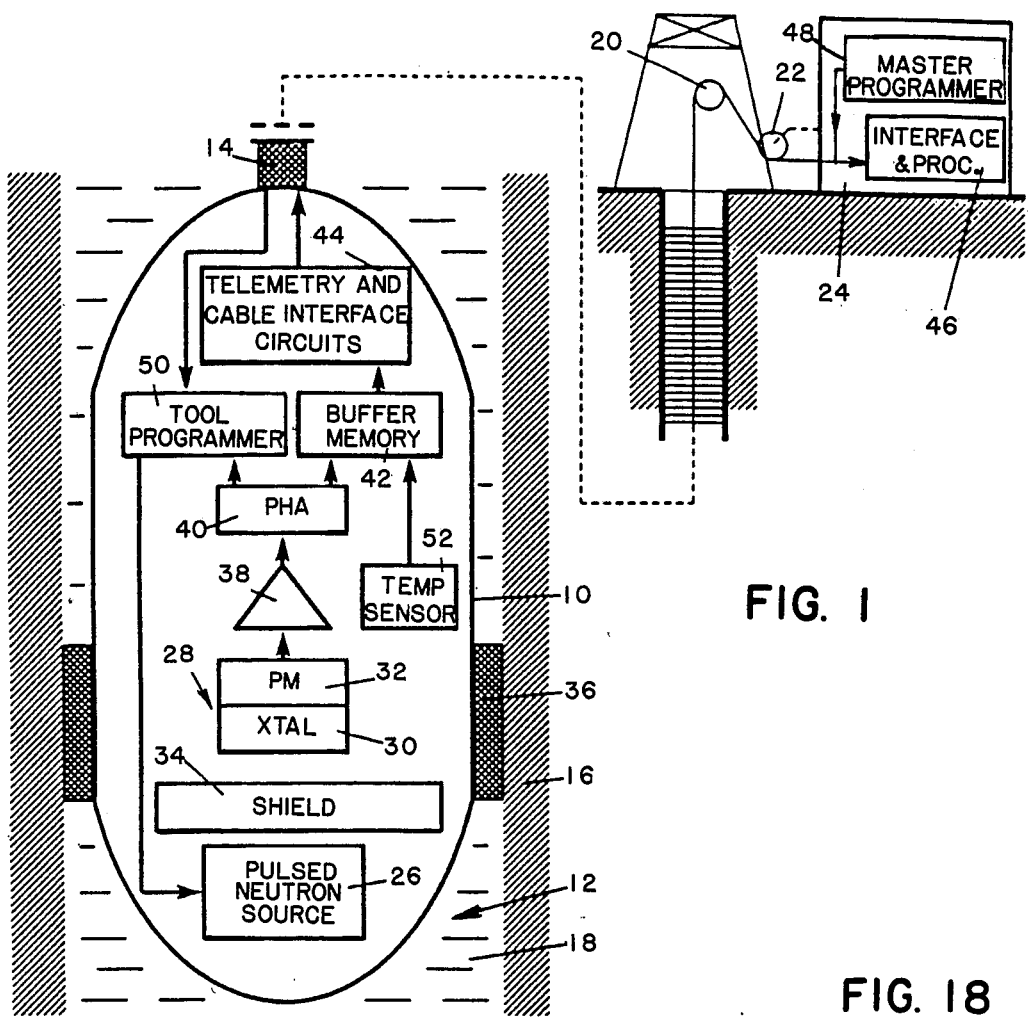
FIG. 1 is a schematic diagram of a logging tool useful in practicing the present invention.
Figure 1B:
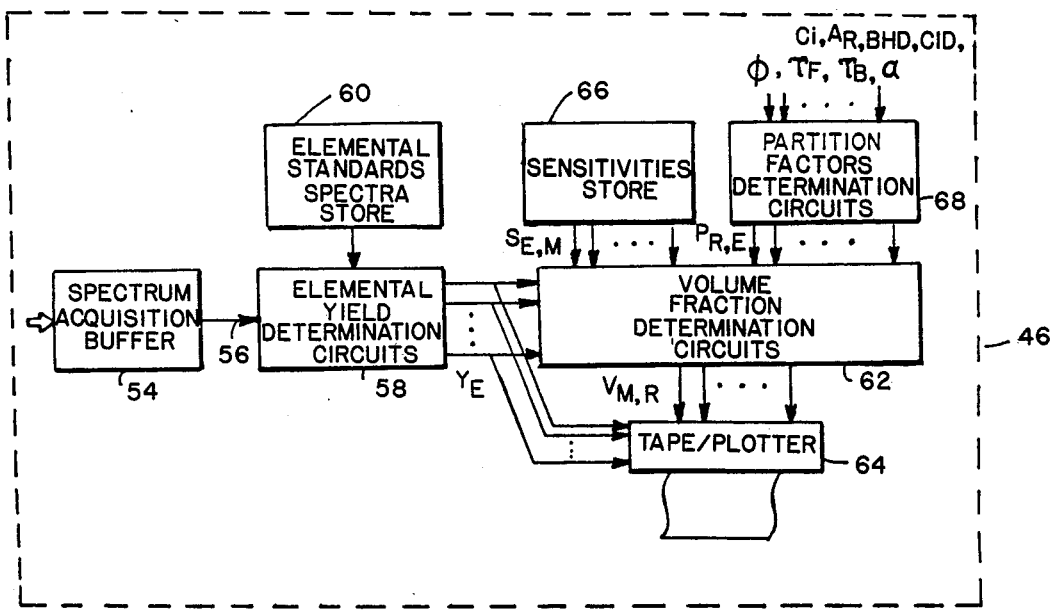

With reference to FIG. 1, a representative embodiment of a logging tool useful in practicing the invention includes a fluid-tight, pressure and temperature-resistant sonde 10 suspended in a borehole 12 on an armored cable 14 for investigating a subsurface earth formation 16. The borehole 12 is illustrated as containing a fluid 18 and as being open, i.e., uncased, although as described hereinafter the borehole may also contain a casing and surrounding cement annulus. The sonde 10 is shown as centered in the borehole 12, but may be eccentered if desired (see FIG. 2). Conventional surface equipment 24, inclusive of a sheave wheel 20 and depth gauge 22, is provided to move the sonde 10 through the borehole 12 and to generate a depth-correlated log of the formation 16.

The logging tool and sonde 10 may generally be constructed in accordance with U.S. Pat. No. 4,055,763 to Antkiw and/or U.S. Pat. No. 4,390,783 to Grau, which are assigned to the assignee of the present application. For certain applications, it may be desirable to add additional logging modules to the sonde, such as a porosity module, a caliper module, a resistivity module or the like. These applications and the desired logging modules are described more fully hereinafter.

As illustrated in FIG. 1, the sonde 10 includes a pulsed neutron source 26 for irradiating the surrounding borehole/formation environment with pulses of high-energy neutrons. Preferably, the source 26 is of the D-T pulsed accelerator type for generating discrete bursts of 14 MeV neutrons at controlled durations and repetition rates. Alternatively, a D—D type source may be employed, productive of 2.5 MeV neutrons. The construction of the source 26 may be in accordance with the commonly-assigned U.S. Pat. No. 3,461,291 to Goodman and U.S. Pat. No. 3,546,512 to Frentrop.

Spaced from the source 26 is a gamma ray detector 28 of a type which produces an output signal corresponding to each detected gamma ray and having an amplitude representative of the energy of the gamma ray. Typically, the detector includes a scintillation crystal 30 and a photomultiplier 32 optically coupled thereto. The crystal is preferably of the thallium-activated sodium iodide type, although any suitable crystal, such as thallium or sodium-activated cesium iodide, bismuth germanate or the like, may be used. Alternatively, a solid-state detector, having a germanium crystal for example, may be used to produce the required signal directly and with sharp energy resolution. Where a solid-state detector is used, the sonde 10 may be modified if needed to incorporate a cryostat or other low-temperature environment for the detector. A suitable cryogenic structure is described in U.S. Pat. No. 4,315,417 to Zarudiansky.

If desired, a neutron shield 34 may be located between the source 26 and the detector 28 to reduce bombardment of the detector by neutrons emanating directly from the source. The sonde may additionally be surrounded by a boron carbide impregnated sleeve 36 in the general region of the source 26 and the detector 28, for the purpose of displacing the borehole fluid and otherwise reducing the number of high-energy gamma rays produced in the borehole 12.

Electrical power for the sonde 10 is supplied via the cable 14 from the surface equipment 24. The sonde 10 includes power conditioning circuitry (not shown) for supplying power at appropriate voltage and current levels to the source 26, the detector 28 and other downhole circuits. These circuits include an amplifier 38 which receives the output pulses from the photomultiplier 32. The amplified pulses are applied to a pulse height analyzer (PHA) 40 which may be of any conventional type such as the single ramp (Wilkinson rundown) type. Other suitable pulse height analog-to-digital converters may be used for the gamma ray energy range to be analyzed. The usual low-level and high-level pulse height discrimintor circuits may be used to define the gamma ray energy range of interest, e.g. from 1.5 MeV to 7.5 MeV. Linear gating circuits may also be employed for control of the time portion of the detector signal train to be analyzed. Improved performance can be obtained by the use of additional conventional techniques such as pulse pile-up rejection.

Pulse height analyzer 40 assigns each detector pulse to one of a number (typically in the range 256 to 8000) of predetermined channels according to its amplitude (i.e. the gamma ray energy), and supplies a signal in suitable digital form representing the channel or amplitude of each analyzed pulse. The occurrences of each channel number in the digital output of pulse height analyzer 40 are accumulated in a buffer memory 42 to provide an energy spectrum, which is then transferred to telemetry and cable interface circuits 44 for transmission over the cable 14 to the surface equipment 24. As described more fully hereinafter, the buffer memory 42 is arranged to accumulate spectral counts during selected time gates or windows of variable starting times and/or widths between neutron bursts.

At the surface the cable signals are received by cable interface and signal processing circuits 46. It will be understood that the circuits 44 and 46 may be of any suitable known construction for encoding and decoding, multiplexing and demultiplexing, amplifying and otherwise processing the signals for transmission to and reception by the surface equipment 24. Appropriate circuits are described, for example, in the commonly-owned U.S. Pat. No. 4,012,712 to Nelligan and U.S. Pat. No. 4,355,310 to Belaiques et al.

The operation of the sonde 10 is controlled by signals sent downhole from a master programmer 48 located in the surface equipment 24. These signals are received by a downhole tool programmer 50 which transmits control signals to the neutron source 26 and the pulse height analyzer 40. In addition, the sonde 10 may contain a temperature sensor 52 for compensating the measurements from the sonde 10 for the temperature of the borehole fluids 18.

The surface equipment includes the various electronic circuits used in accordance with the present invention. These circuits may comprise special purpose hardware, but preferably are in the form of an appropriately programmed general purpose computer. The operations to be performed by such circuits are described in more detail hereinafter in connection with FIGS. 18 and 19. As will be apparent to those skilled in the art, the programming of a general purpose computer to carry out these operations involves merely the straightforward application of known programming techniques and is well within the ordinary skill of the art.

The present invention is based upon the development of a borehole correction model, from data obtained from a large number of laboratory measurements of different borehole/formation measurement environments, for predicting the effects on capture gamma ray spectroscopy measurements of the borehole geometry and constituents. The model predicts the borehole effects from assumed knowledge of the borehole and casing sizes, the borehole fluid salinity, and the known formation capture cross section. The parameters describing the measurement timing, i.e. the neutron burst rate, the time delay between burst end and the beginning of the spectrum accumulation gate, and the width of the accumulation gate, are explicit parameters in the model. Thus while the modeling results described and illustrated herein are for the specific timing schemes of the tool used in the laboratory measurements, the model applies equally well to other timing schemes and to other logging tools. Certain of the physical principles underlying the model are discussed in the paper by Grau et al. entitled "In Situ Neutron Capture Spectroscopy of Geological Formations", AIP Conference Proceedings, No. 125, p. 799 (1985), and the pertinent portions of that paper are hereby incorporated by reference.

Figure 2:
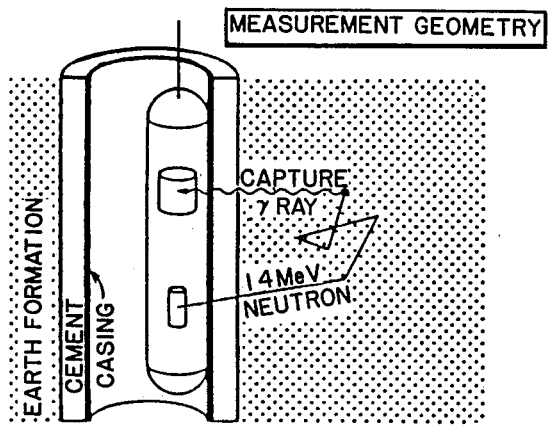
FIG. 2 is a schematic diagram of a representative geometry of the borehole/formation measurement environment.

The measurements used to describe the model were made in formation tanks 1.6 meters high by 1.2 meters in diameter with a field-worthy Gamma Ray Spectroscopy Tool, GST ™, constructed generally as described in connection with the sonde 10 of FIG. 1. The measurement geometry is illustrated in FIG. 2 for the example of a cased hole. Open-hole measurements were also made. As indicated in FIG. 2, the neutron source was a 14 MeV D-T accelerator. The detector was a NaI (Tl) detector. The sonde was generally eccentered in the borehole, although a centered sonde could be employed.

Over a thousand unique borehole/formation measurement environments were measured by varying the following parameters: borehole diameter—9.5, 15.2, 20.3, 25.4 or 30.5 cm, casing size—at least two for each of the 15 to 30 cm boreholes, borehole fluid—oil or water, borehole water salinity—0 to 230 KPPM, borehole fluid displacer (boron carbide sleeve)—none, 10.8 cm or 14.0 cm diameter, formation fluid—oil or water, formation water salinity—0 to 230 KPPM, formation lithology—sandstone, limestone, or dolomite, neutron burst timing—inelastic mode or capture-tau mode.

As described in U.S. Pat. No. 4,055,763 to Antkiw, the GST tool is operable in two different timing schemes, the inelastic mode, in which the timing of the neutron bursts and the spectrum accumulation gates are optimized for inelastic scattering gamma rays, and the capture-tau mode, in which the burst timing and the spectrum windows are optimized for thermal neutron capture gamma rays. When used in the inelastic mode to make the modeling measurements herein described, the GST tool was operated so as to generate a 20 microsecond burst every 100 microseconds, with a 44 microsecond-wide accumulation gate starting 20 microseconds after the burst. In the capture-tau mode, the timing is controlled by the measured formation decay time constant, $\tau_F$. The capture-tau mode timing scheme for the modeling measurements was a 1 $\tau_F$-wide neutron burst at intervals of 6 $\tau_F$ and a 2 $\tau_F$-wide accumulation gate starting 1 $\tau_F$ after the burst.

Figure 3:
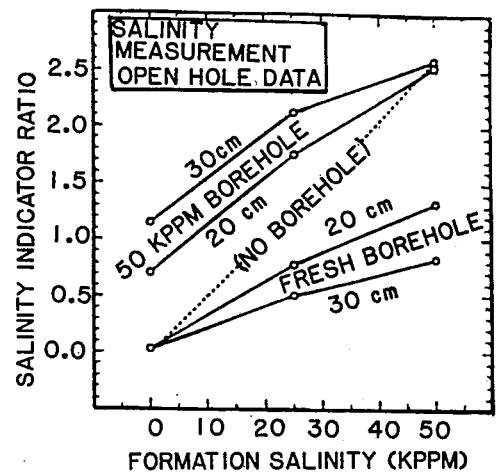
FIG. 3 is a graph of the salinity indicator ratio, $Y_{Cl}/Y_H$, versus formation salinity, illustrating the effect thereon of borehole size and salinity.

A sample of the measurement results, illustrating the magnitude of the borehole effects, is shown in FIG. 3. Plotted on the ordinate is the salinity indicator ratio such as that provided by prior gamma ray spectroscopy tools, i.e., the chlorine elemental yield, $Y_{Cl}$, divided by the hydrogen elemental yield, $Y_H$, as described, for example, in U.S. Pat. No. 4,464,569 to Flaum. This indicator is taken as a measure of formation salinity. FIG. 3 clearly shows, however, that the indicator is perturbed substantially by the salinity of the borehole fluid. The dashed line in FIG. 3 would be the measurement response in the absence of borehole effect. It agrees with the measurement only when the formation and borehole salinities are equal. At other points along the curve the relative contributions from the formation and the borehole must be accurately determined to interpret the salinity indicator measurement correctly.

The elemental yields described in the model description refer to the relative contributions to the detected gamma ray spectra from the chemical elements in question, as determined by the spectrum-comparison technique originally described in U.S. Pat. No. 3,521,064 to Moran et al. and further developed and improved in accordance with U.S. Pat. No. 4,055,763 to Antkiw and U.S. Pat. No. 4,394,574 to Grau et al. It will be understood, however, that the model is applicable as well to measurements of elemental contributions obtained by looking directly at specific gamma ray energies known to be characteristic of the element(s) of interest, as might be done, for example, with a high-resolution solid-state detector. The term "elemental yield" as used herein, therefore, is intended to encompass all such measurements or determinations of the elemental contributions (or elemental proportions or abundances) to the gamma ray energy spectra appropriately calibrated for the specific acquisition system used.

In the model of the invention, an elemental yield, $Y_E$, is parameterized as:

$$Y_E = a\Sigma_R P_{R,E} \Sigma_M S_{E,M} V_{M,R} \quad (1)$$

where a is a normalization factor, $P_{R,E}$ is the regional partition factor, $S_{E,M}$ is the sensitivity for detecting the element E in a particular mineral M, and $V_{M,R}$ is the volume fraction of the mineral M in a particular region R of the borehole/formation environment. For purposes of formation analysis, the volume fractions $V_{M,R}$ are of course the desired products of the measurement. For convenience, the ratio of a borehole partition factor to the formation partition factor, $P_{B/F}$, is preferably formed, where the subscript B denotes one of the borehole regions R. The sensitivity factors, $S_{E,M}$ are readily expressed in terms of the microscopic thermal neutron capture cross section, $\sigma$, atomic densities, $\mu$, gamma ray branching fractions, b, and detection efficiencies, $\epsilon$, as follows:

$$S_{E,M} = \sigma_E \mu_{E,M} \Sigma_{\gamma i} b_{E,\gamma i} \epsilon_{\gamma i} \quad (2)$$

Except for the atomic densities, the parameters of Eq. (2) are not generally known with sufficient accuracy to allow an analytical calculation of $S_{E,M}$. Rather, the sensitivities can be determined empirically from the laboratory data. But since only relative sensitivities need be known, the determination can readily be done. More detailed information concerning the sensitivity factors, $S_{E,M}$, and the manner of derivation thereof is set out in the commonly-owned U.S. Pat. No. 4,464,569 to Flaum, the pertinent portions of which are hereby incorporated by reference. As will be understood, the sensitivity factor calibrations would differ if the elemental yields were determined from energy peaks rather than through the spectrum-comparison technique employed in the model and in the Flaum '569 patent.

With respect to the estimation of the regional partition factors, $P_{R,E}$, it has been determined that the borehole/formation measurement environment can be divided into five regions: the tool pressure housing, PH (representing all of the iron in the sonde), the borehole fluid, BF, the casing, Cas, the cement annulus around the casing, Ce, and the earth formation, F. Each of these regions is regarded as being substantially homogeneous. For open hole data, the absence of casing and cement allows these regions to be eliminated from consideration. Thus for elemental yields other than iron (or any other element which would be present in the tool itself), the only open hole regions that need be considered are the borehole fluid and the formation, so that the borehole/formation partition ratio, $P_{BF/F}$, for this case may readily be backed out of the measurement:

$$P_{BF/F} \text{ (Open Hole)} = \frac{PR(1-\phi) - \phi(1-EF)}{1-EB} \quad (3)$$

where $\phi$ is the formation porosity fraction, EF and EB are the effective volume fractions of salt in the formation and borehole fluids, respectively, and PR is the sensitivity-corrected porosity indicator ratio measurement:

$$PR = \frac{Y_H/S_{H,Water}}{Y_{Si}/S_{Si,Quartz} + Y_{Ca}/S_{Ca,Calcite}} \quad (4)$$

In accordance with the aforementioned nomenclature, the water, quartz and calcite subscripts designate the minerals, M, in which the elements, E, hydrogen, silicon and calcium, respectively, are contained.

Figure 4:
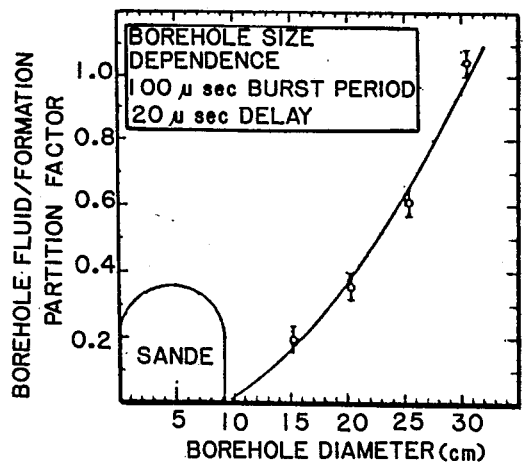
FIG. 4 is a graph of the ratio of borehole fluid to formation partition factor, $P_{BF/F}$, versus borehole diameter for open hole data, showing the borehole size dependence of $P_{BF/F}$.
Figure 5:
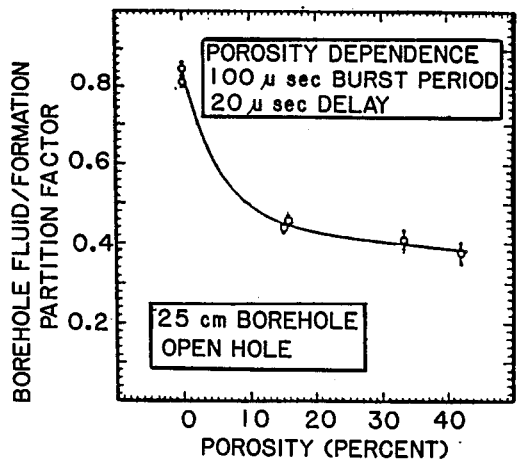
FIG. 5 is a plot similar to that of FIG. 4, but showing the dependence of the open-hole borehole fluid/formation partition factor ratio, $P_{BF/F}$, on formation porosity.
Figure 6:
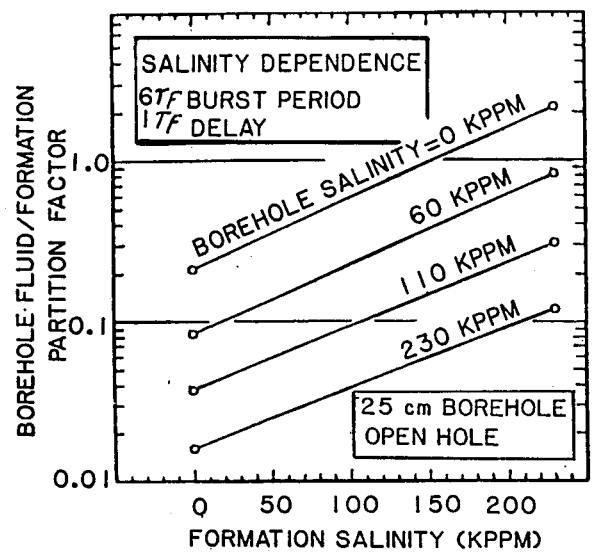
FIG. 6 depicts the dependence of the open-hole borehole fluid/formation partition factor ratio, $P_{BF/F}$, on formation and borehole salinities.

FIG. 4 shows the borehole size dependence of the open-hole relative borehole fluid/formation partition factor, $P_{BF/F}$, as calculated from Eq. (3) and using the timing scheme indicated on the figure. As is apparent, $P_{BF/F}$ changes by a factor of five over the borehole diameter range of 15 to 30 cm. FIG. 5, which illustrates the porosity dependence of the partition factor ratio with the same timing scheme, shows a factor-of-two change in $P_{BF/F}$ with formation porosity over the 0 to 40% pososity range. By far the most significant influence on $P_{BF/F}$, however, comes from salinity changes. This is depicted in FIG. 6, wherein $P_{BF/F}$ is seen to change two orders of magnitude over the full range of borehole and formation salinities. The data of FIG. 6 were taken with the tool operating in the capture-tau timing mode. The predictive model of the invention is applicable to all three of the dependencies shown in FIGS. 4-6 and to the two different timing schemes employed. Although data are shown in FIGS. 4-6 and other figures for the borehole fluid region, BF, only, similar effects exist for the other borehole regions, PH, Cas and Ce as well.

In general, the regional partition factors may be expressed as follows:

$$P_{R,E} = \int_{V_R} \int_t \phi(r,t) \Gamma(r, E_{\gamma E}) dt^3 r \quad (5)$$

where $V_R$ is the integration volume for region R, $\phi_R$ is the neutron flux distribution in the region R, $\Gamma$ is the gamma ray transmission and detection probablity, and $E_{\gamma E}$ is the average gamma ray energy for element E.

According to a feature of the invention, the model assumes, for the purpose of the partition factor calculation, that the time dependence of $\phi_R(r,t)$ can be separated from the spatial dependence; i.e.:

$$\phi_R(r,t) = \phi_R(r,0) F_R(t) \quad (6)$$

where $F_R(0) = 1$, and $\phi_R(r,0)$ and $F_R(t)$ are the separable spatial-dependence and time-dependence components, respectively, and t is the time after the end of the neutron burst.

Each partition factor may then be expressed as a product of a spatial integral and a time integral:

$$P_{R,E} = \int_{V_R} \phi_R(r,0) \Gamma(r, E_{\gamma E}) d^3 r \int_t F_R(t) dt \quad (7)$$

While the general form of Eq. (7) provides for a partititon factor $P_{R,E}$ for each element E in each region R, it has been determined that for the gamma ray energies typically looked at in the analysis of thermal neutron capture spectra from earth formations, i.e., H, Si, Ca, Cl, Fe and S, the elemental dependence of the partition factor may be ignored. That is to say, the differences in $\Gamma$ for the different elements need not be taken into account, and a single partition factor, $P_R$, may be determined that is applicable to all elements E in a given region, R.

In cases where the elemental yields, $Y_E$, are determined by the direct measurement of energy peaks, it may be necessary to take the gamma ray energy dependence of the gamma transport term, $\Gamma$, of Eq. (7) into account in determining the appropriate regional partition factor(s) for the element(s) in question.

The spatial integral of Eq. (7) is responsible for the geometrical effects illustrated in FIG. 4 and for the porosity effects illustrated in FIG. 5, while the time integral is responsible for the salinity effects illustrated in FIG. 6. The advantage of the formulation of Eq. (7) is that it separates the more difficult to evaluate spatial integral from the more strongly varying time integral. By varying only the borehole and formation salinities, as in FIG. 6, the value of the spatial integral is held constant, allowing an independent evaluation of the behavior of the time integral.

Figure 7:
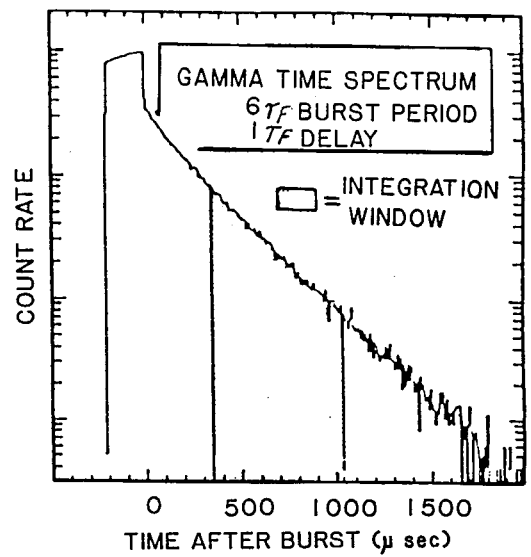
FIG. 7 is a schematic plot of a measured gamma ray time spectrum, showing a single spectrum accumulation (integration) window between neutron pulses.
Figure 8:
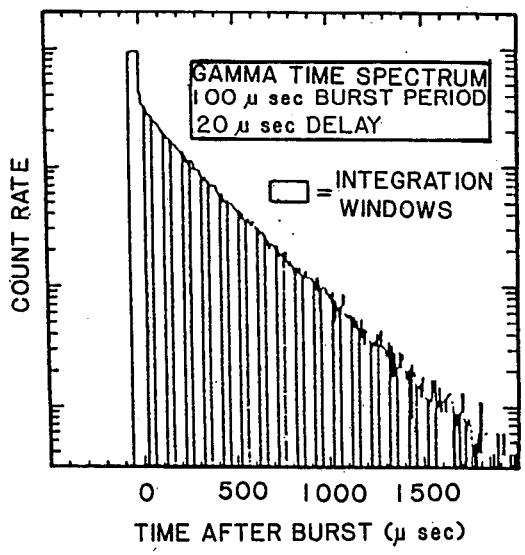
FIG. 8 is a plot similar to that of FIG. 7 showing a plurality of discrete spectrum accumulation time windows between pulses.

The time integral of F(t) is performed over the spectral accumulation time interval, but two separate source pulsing regimes must be considered. If the neutron source is pulsed slowly enough that the neutron flux dissipates before the next pulse, as in the capture-tau mode of the GST tool, the integration window or gate is a single time interval. This condition is illustrated in FIG. 7. When the source pulse repetition rate is too high for the neutron flux to dissipate between bursts, as in the inelastic mode of the GST tool with a burst period of 100 microseconds, contributions from many previous pulses must be included in the integration. This is accomplished by adding later integration gates from one pulse until F(t) becomes vanishingly small. This type of integration is depicted in FIG. 8.

The next step is to describe F(t) in terms of known parameters. For the formation region, it is known that F(t) decays, to a good approximation, as a simple exponential dependent upon the thermal neutron decay time, $\tau_F$, of the formation, i.e.:

$$F_F(t) = e^{-t/\tau_F} \quad (8)$$

As described in the aforementioned U.S. Pat. No. 4,055,763 to Antkiw, the GST tool makes a concurrent measurement of $\tau_F$ in the capture-tau mode. If available, this $\tau_F$ measurement may be used in Eq. (8) to obtain the formation time integral. In the absence of a concurrent measurement, an external $\tau_F$ could be used from any thermal neutron decay time tool.

Figure 9:
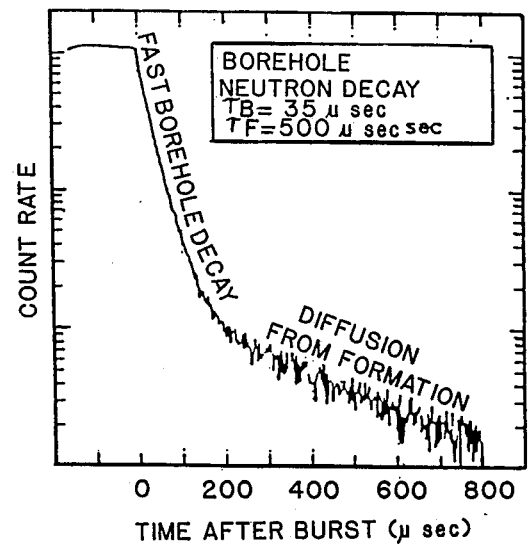
FIG. 9 is a graph of gamma ray count rate versus time showing the dependence of the decay rate on the borehole and formation constituents.

F(t) in the borehole region, however, is more complex, because the effects of neutron diffusion are both large and environmentally dependent. FIG. 9 illustrates a measurement of neutron flux in a quickly decaying borehole, the decay time constant of the borehole, $\tau_B$, being 35 microseconds and that of the formation, $\tau_F$, being 500 microseconds. After about 200 microseconds the borehole assumes the decay rate of the formation, as it is then being fed primarily by formation neutrons (back diffusion). In one characterization, F(t) within the borehole may be given by:

$$F_B(t) = (1 - \beta_B)e^{-t/\tau_B} + \beta_B e^{-t/\tau_F} \quad (9)$$

where B is any one of the borehole regions R and $\beta_B$ is the amplitude of the borehole decay in the borehole region B.

For purely geometrical reasons, the effects of diffusion are larger for smaller regional areas. Since the amplitude of the late borehole decay, $\beta_B$, must fall between 0 and 1, an appropriate parameterization is:

$$\beta_B = 1 - e^{-\alpha/A_B} \quad (10)$$

where $\alpha$ is an empirically determined parameter and $A_B$ is the cross sectional area of borehole region B.

Figure 10:
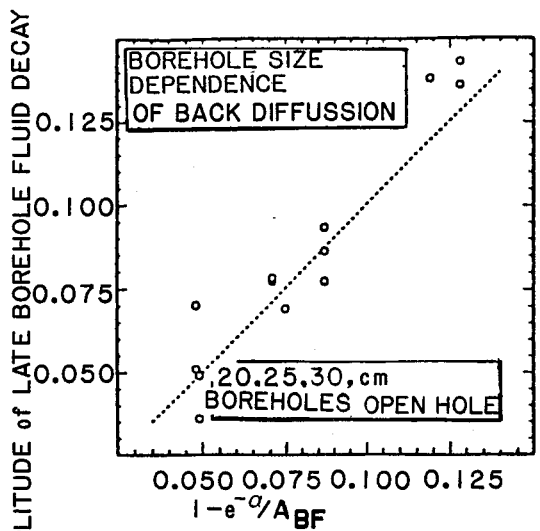
FIGS. 10 and 11 are graphs illustrating the borehole size dependence of the effect of neutrons diffusing from the formation back into the borehole for open hole measurements and cased hole measurements, respectively.
Figure 11:
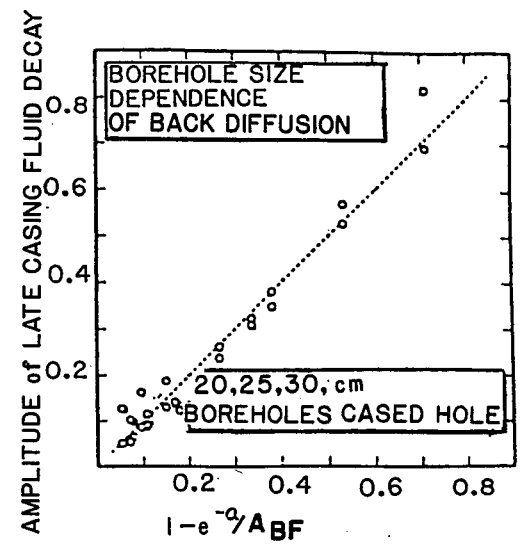

FIGS. 10 and 11 show fits of Eq. (10) for the borehole fluid regions, BF, of certain open-hole and cased-hole data, respectively, for borehole diameters over the 20 to 30 cm range. The necessity of a borehole size parameterization is clearly indicated.

Figure 12:
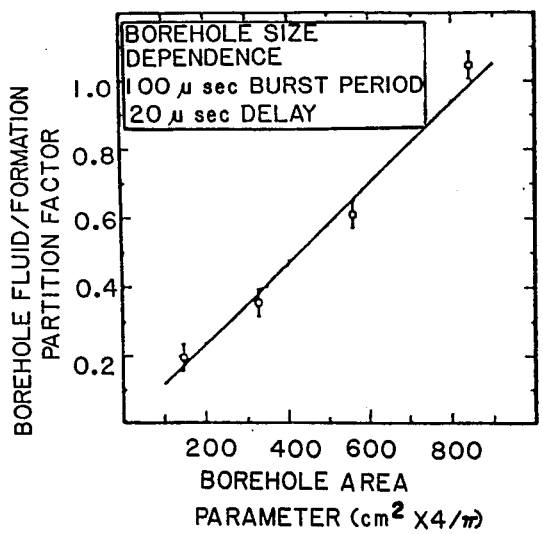
FIG. 12 is a plot of the borehole fluid/formation partition factor ratio $P_{BF/F}$, as a linear function of the cross sectional area of the borehole fluid, for the case of open hole data with freshwater in the borehole and formation.

The spatial integral of Eq. (7) depends not only upon geometry, but also upon such physical parameters as neutron slowing down lengths and gamma ray scattering cross sections, and hence formation porosity. As it would be extremely difficult to evaluate this integral analytically, or even to express it in pseudo-physical form, the spatial integral is preferably parameterized empirically from the measurement results. The borehole size dependence, for example, may be modeled by a nearly linear function of the cross-sectional area of the borehole region, as shown in FIG. 12, which is a plot of $P_{BF/F}$ at constant porosity and salinity as a function of borehole fluid area. The porosity dependence was modeled by a completely empirical function that changes rapidly between 0 and 10% porosity, as shown for example, in the solid line of FIG. 5.

Suitable empirically-derived expressions for the spatial integral for the various regions of the borehole/formation environment are as follows:

Tool Pressure housing: $\int v_{PH} = C_1 A_{PH}$ (11)

Borehole Fluid:
$\int v_{BF} = [C_1 + C_2 BHD(BHD - CID)] A_{BF}$ (12)

Casing: $\int v_{Cas} = C_1 A_{Cas}$ (13)

Cement: $\int v_{Ce} = C_1 A_{Ce}$ (14)

Formation: $\int v_F = C_3(\phi + C_4)^{C_5}$ (15)

where $C_{1-5}$ (hereinafter generically referred to as $C_i$'s) are constants determined from measurement data, $A_B$'s are the cross sectional areas of the respective borehole regions, i.e., pressure housing, borehole fluid, casing, etc., BHD is the borehole diameter, CID is the casing inner diameter, and $\phi$ is formation porosity.

Figure 13:
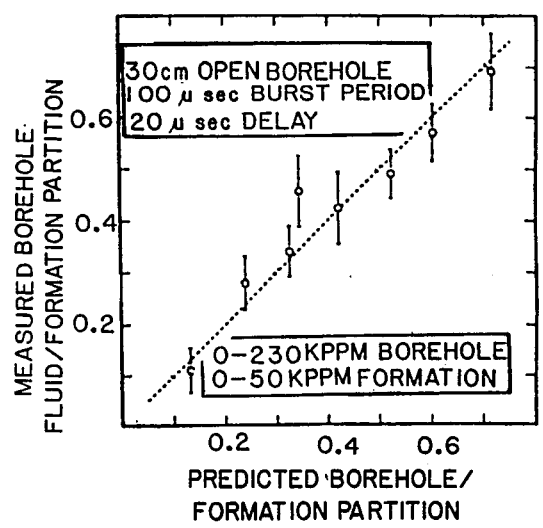
FIGS. 13, 14 and 15 are graphs showing representative predicted versus measured borehole fluid/formation partition factors, $P_{BF/F}$, for different measurement geometrics and spectrum accumulation gating schemes.
Figure 14:
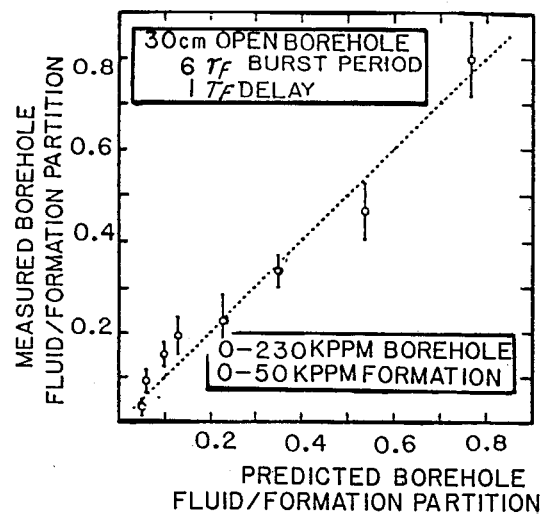
Figure 15:
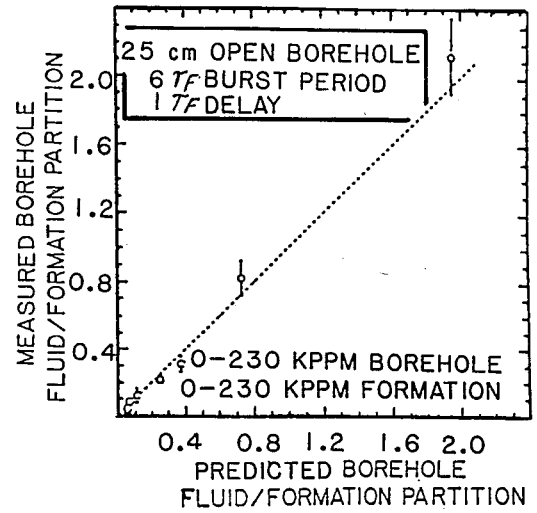
Figure 16:
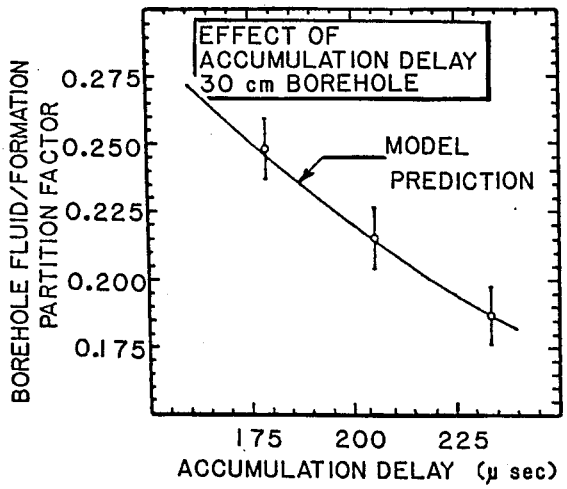
FIG. 16 depicts the effect on $P_{BF/F}$ of varying the time delay between the end of a neutron burst and the start of the spectrum accumulation gate.
Figure 17:
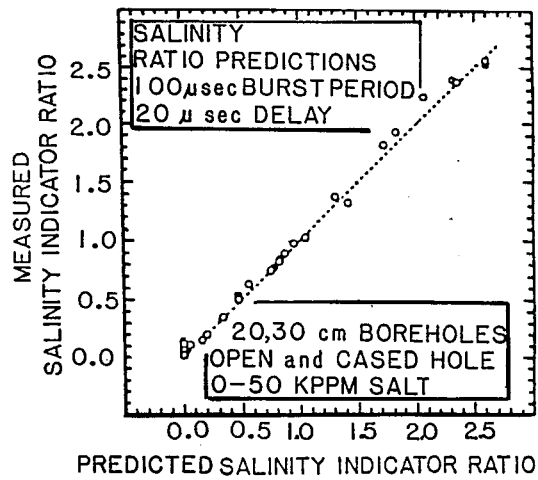
FIG. 17 is a plot of predicted versus measured salinity indicator ratios, $Y_{Cl}/Y_H$, for low salinity environments.

FIGS. 13, 14, and 15 show comparisons of measured borehole fluid-to-formation partition factors to those calculated by the model of the invention. For each figure, the geometry and porosity were held constant, while the borehole and formation salinities were varied. The variations in the predicted partition factors for these cases are due entirely to the integration of F(t). The data in FIGS. 13 and 14 are from the same set of environments but with different measurement timing schemes. As the data indicates, the model handles them equally well. While for these measurements the large formation capture cross sections responsible for the high borehole contributions were due to high water salinities, the presence of the high cross section elements commonly associated with clays will produce the same effect. In either case, the effect will be predicted properly from a measured value of $\tau_F$. As a further test of the model, the delay time between the end of the neutron burst and the start of the gamma-ray accumulation gate was varied for selected environments. Once again, the only change should be in the integration of F(t). FIG. 16 shows the model predictions for $P_{BF/F}$ along with measured values at three different delay times. The agreement is more than adequate. Finally, FIG. 17 is a plot of predicted vs. measured salinity indicator ratios for the data presented in FIG. 3, along with some additional cased hole data.

As shown above, the model decouples or separates the dependencies upon geometry and porosity from the dependence upon water salinity. This allows an analytical calculation of the water salinity effect, which can alter the relative borehole contribution by two orders of magnitude. At the same time, the geometry and porosity dependencies, which are smaller but less readily calculable, can be treated empirically. Also, the model is capable of handling different timing schemes with equal success, as illustrated by reference to the capture-tau mode and the inelastic mode of the GST tool, the former having a relatively long, variable accumulation gate delay dependent upon $\tau_F$ and the latter having a short, fixed delay requiring consideration of contributions from many previous neutron pulses. Although the variations in borehole contribution experienced in any one well would not likely be as large as is suggested by the laboratory data shown in FIGS. 3-17, because depth-to-depth variations in borehole sizes, borehole salinities, and formation decay times do not normally cover the full ranges represented in the laboratory data, the model is nonetheless capable of adequately handling such variations should they occur.

In accordance with the invention, the time and spatial integrals are preferably computed on a depth-to-depth basis and used in Eq. (7) to determine the regional partition factors $P_R$, at each depth. The partition factors are then used in accordance with Eq. (1) to correct the elemental yield measurements for borehole effects and arrive at improved measurements of the volume fractions of the various elements and/or minerals. Where the necessary external measurements required by the time and spatial integrals, e.g. $\tau_F$, porosity, borehole diameter, etc., are available concurrently, this may be done in real time and a depth-corrected log of the volume fractions recorded at the well site. Alternatively, and where concurrent external data are not available, the partition fraction computations and the volume fraction computations can be carried out at a central processing site based on previously recorded data.

With reference now to FIG. 18, the functional components of the surface processing circuits 46 for carrying out the foregoing computations include a capture spectrum acquisition buffer 54 which, following decoding of the counts-per-channel spectral data from the sonde 10, accumulates the capture gamma ray energy spectrum for the desired time interval, which conventionally is a function of the desired depth resolution of the log. Spectral data from the buffer 54 is supplied via the line 56 to the elemental yield determination circuits 58 for determination of the desired $Y_E$'s. As noted, for purposes of the chemical analysis of capture gamma ray spectra, the elements typically looked at are Si, Ca, Cl, H, Fe and S. Preferably, the yield determination circuits 58 comprise a spectrum comparator circuit and associated capture spectrum gain/offset adjustor circuit for deriving the elemental yields based on the comparison of the detected spectrum from the sonde 10 with a composite spectrum made up of a weighted set of elemental standard spectra from a store 60. The elemental standard spectra are derived beforehand in laboratory formations and include spectra for the anticipated constituents of the borehole 12 and the formation 16. The derivation of the standard spectra and the operation of circuits 58 to determine the elemental yields may be as described in U.S. Pat. No. 4,464,569 to Flaum, the pertinent portions of which are hereby incorporated by reference. The elemental yields, $Y_E$'s, are then applied to volume fraction determination circuits 62, and also to a tape plotter 64 or other recording device such as a magnetic tape drive for recording as a function of tool depth.

The volume fraction determination circuits 62 may also be constructed generally in accordance with the referenced portions of the Flaum U.S. Pat. No. 4,464,569. That is to say, the circuits 62 solve the matrix of yield equations corresponding to the non-zero values of the spectral elemental yields, $Y_E$'s. As described above, these yield equations or relationships take the form of Eq. (1). Hence the circuts 62 require as inputs the sensitivity factors $S_{E,M}$, which, as noted, are determined from laboratory data, and which are stored in a sensitivities store 66, and the regional partition factors, $P_{R,E}$, which are calculated in circuits 68. At this point, the predetermined sensitivities, $S_{E,M}$, the regional partition factors, $P_{R,E}$, and the elemental yields, $Y_E$, are entered into the established yield relationships for the specific elements and borehole/formation measurement environment at the depth in question and the values for the volume fractions, $V_{M,R}$, for the various regions R are determined by the circuits 62. The $V_M$ values are then output to the tape plotter 64 for recording. As will be understood, this computation is repeated for each depth interval over the full zone of the earth formation being logged. The Flaum '569 patent describes the general solution of such sets of yield equations, except, of course, for the additional step of reading the regional partition factors into the equations, this being a feature of the present invention.

Figure 19:
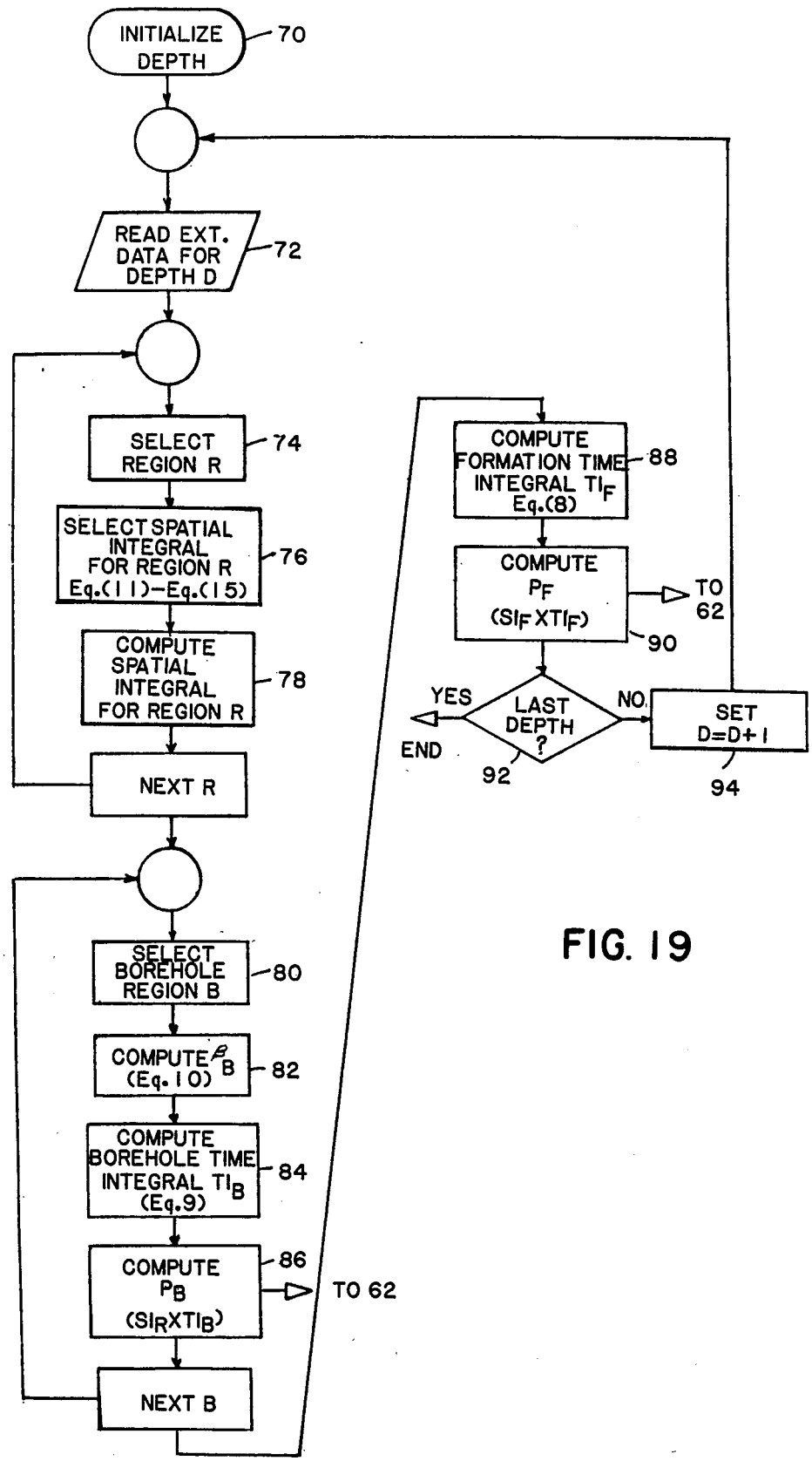
FIG. 19 is a flow diagram illustrating the performance of the functional operations of the partition factors determination circuits of FIG. 18 in a programmed general purpose computer.

FIG. 19 is a flow diagram illustrating the functional steps performed by the partition factor determination circuits 68 in computing the partition factors, $P_{R,E}$, based on the input thereto of the known external data indicated in FIG. 18 and the relationships of the model. Inasmuch as the partitition factors are determined for each depth interval, the first step 70 is to initialize the starting depth at depth D, and then to read, at 72, the external data for that depth that are required for the partition factor calculations. As may be seen from Eqs. (8)-(15) these include $\tau_F$, $\tau_B$ and $\alpha$, for the formation and borehole time integrals and the constants $C_i$'s, the regional Areas $A_B$'s, BHD, CID and $\phi$ for the spatial integrals. Certain of these data are predetermined, such as $\alpha$, CID and certain $A_B$'s, or may be obtained from a concurrent or preexisting measurement, such as $\tau_F$, $\tau_B$, BHD, $\phi$ and the remaining $A_B$'s. As already noted, $\tau_F$ is available from the GST tool in the capture-tau mode. $\tau_B$ is available from the resistivity log. The BHD may be obtained for open holes from a caliper log, and $\phi$ can be obtained by running a thermal neutron or epithermal neutron porosity log along with the GST. $A_{BH}$ for open holes may readily be calculated on line from the caliper log. The availability of concurrent external data allows the $P_R$'s, and also the volume fractions, $V_{M,R}$, to be computed on-line, i.e., in real time, and step 72 in FIG. 19 provides for this. External data can include any pre-existing knowledge or assumptions about the volume fractions of each mineral M in any of the regions R. Where concurrent external data is unavailable, any necessary computations to obtain such data may be carried out in advance for all depth intervals rather than on a depth-by-depth basis.

Once the external data for depth D is read, the next steps 74 and 76 are to select the first region R for calculation of the $P_{R,E}$ and then to select the corresponding spatial integral relationship from Eqs. (11)-(15). The spatial integral is then calculated, as indicated at step 78, and steps 74-78 are repeated until the spatial integrals have been calculated for all regions R. Next, a borehole B is selected at 80 and $\beta_B$ is calculated at 82 for that region B in accordance with Eq. (10). The value of $\beta_B$ is then used in step 84 to compute the borehole time integral, $TI_B$, from Eq. (9). Thereafter, and in accordance with Eq. (7), the partition factors for the selected borehole region, i.e., the pressure housing, $P_{PH}$, the borehole fluid, $P_{BH}$, the casing, $P_{cas}$, and the cement, $P_{ce}$, is determined in step 86 from the product of the spatial integral, $SI_R$, and the borehole time integral, $TI_B$, for that region. The loop 80–86 is then repeated for the remaining borehole regions B.

The formation time integral, $TI_F$, is then computed in step 88 by use of Eq. (8), followed by the calculation of the partition factor for the formation, $P_F$, in step 90 from the product of the formation spatial integral, $SI_F$, and the formation time integral, $TI_F$. The partition factors $P_B$ and $P_F$ for depth D are read out to the volume fraction determination circuits 62 for use in computing the volume fractions $V_{M,R}$, as aforementioned. The depth is then tested at 92 to determine if the last depth of interest has been reached and, if not, the depth is incremented by one interval, as at 94, and steps 72–92 are repeated for subsequent depths until the full zone has been completed.

Although the invention has been described herein by reference to specific embodiments thereof, it will be understood that such embodiments are susceptible of modification and variation without departing from the inventive concepts disclosed. All such modifications and variations, therefore, are intended to be encompassed within the spirit and scope of the appended claims.

I claim:

1. A method for analyzing an earth formation traversed by a borehole, comprising:
   moving a logging tool, including a pulsed high-energy neutron source and a gamma ray detector, through the borehole;
   irradiating the borehole/formation environment with pulses of high-energy neutrons from said source;
   detecting gamma rays with said detector which result from the capture of thermal neutrons by chemical elements of the borehole and formation constituents;
   determining from said detected gamma rays elemental gamma ray yields, $Y_E$, indicative of the presence of specific chemical elements, E, in the borehole/formation measurement environment;
   determining sensitivity factors, $S_{E,M}$, representative of the efficiency of detecting said chemical elements, E, in predetermined borehole and formation constituents, M;
   deriving for each of predetermined constituent regions, R, in the borehole/formation measurement environment which contains a chemical element, E, of interest a partition factor, $P_{R,E}$, which is a function of the spatial and temporal effects of said region on said gamma rays; and
   determining from said elemental gamma ray yields, $Y_E$, said sensitivity factors, $S_{E,M}$, and said partition factors, $P_{R,E}$, the volume fractions, $V_{M,R}$, of said constituents M in said borehole/formation regions R.

2. The method of claim 1 wherein said partition factor, $P_{R,E}$, is determined by combining a first function of the spatial effects of said region R on said gamma rays and a second function of the temporal effects of said region R on said gamma rays.

3. The method of claim 2 wherein said first function is representative of the spatial dependence of the thermal neutron flux distribution, $\phi_R$, within said region R and said second function is representative of the time dependence of the thermal neutron flux distribution, $\phi_R$, within said region R.

4. The method of claim 2 wherein said first function and said second function for each region, R, are combined by multiplying said first and second functions to provide said partition factor, $P_{R,E}$, for said region R.

5. The method of claim 2 wherein the step of determining said first and second functions comprises the prior step of determining a model which decouples the spatial dependence of the thermal neutron flux distribution within each region, R, from the time dependence of the thermal neutron flux with said each region, R, to permit the partition factor $P_{R,E}$, for said each region, R, to be expressed as separately determinable spatial and temporal integrals.

6. The method of claim 1 wherein:
   said borehole is an open borehole; and
   said borehole/formation measurement environment is assumed to comprise a constituent region, R, corresponding to each of the logging tool, the borehole fluid, and the earth formation; and
   a partition factor $P_{R,E}$, is determined for each of said three regions, R.

7. The method of claim 1 wherein:
   said borehole is a cased borehole; and
   said borehole/formation measurement environment is assumed to comprise a constituent region, R, corresponding to each of the logging tool, the borehole fluid, the borehole casing, the cement annulus surrounding the casing, and the earth formation; and
   a partition factor, $P_{R,E}$, is determined for each of said five regions, R.

8. The method of claim 1 further comprising recording said volume fractions as a function of depth within the borehole.

9. A method for analyzing an earth formation traversed by a borehole from thermal neutron capture gamma rays detected within a borehole traversing the formation, comprising:
   determining from said detected gamma rays elemental gamma ray yields, $Y_E$, indicative of the presence of specific chemical elements, E, in the borehole/formation measurement environment;
   determining sensitivity factors, $S_{E,M}$, representative of the efficiency of detecting said chemical elements, E, in predetermined borehole and formation constituents, M;
   deriving for each of predetermined constituent regions, R, in the borehole/formation measurement environment which contains a chemical element, E, of interest a partition factor, $P_{R,E}$, which is a function of the spatial and temporal effects of said region on said gamma rays; and
   determining from said elemental gamma ray yields, $Y_E$, said sensitivity factors, $S_{E,M}$, and said partition factors, $P_{R,E}$, the volume fractions, $V_{M,R}$, of said constituents M in said borehole/formation regions R.

10. The method of claim 9 wherein said partition factor $P_{R,E}$, is determined by combining a first function of the spatial effects of said region R on said gamma rays and a second function of the temporal effects of said region R on said gamma rays.

11. The method of claim 10 wherein said first function is representative of the spatial dependence of the thermal neutron flux distribution, $\phi_R$, within said region R and said second function is representative of the time dependence of the thermal neutron flux distribution, $\phi_R$, within said region R.

12. The method of claim 10 wherein said first function and said second function for each region, R, are combined by multiplying said first and second functions to provide said partition factor, $P_{R,E}$, for said region R.

13. The method of claim 10 wherein the step of determining said first and second functions comprises the prior step of determining a model which decouples the spatial dependence of the thermal neutron flux distribution within each region, R, from the time dependence of the thermal neutron flux with said each region, R, to permit the partition factor, $P_{R,E}$, for said each region, R, to be expressed as separately determinable spatial and temporal integrals.

14. The method of claim 9 wherein:
said borehole is an open borehole; and
said borehole/formation measurement environment is assumed to comprise a constituent region, R, corresponding to each of the logging tool, the borehole fluid, and the earth formation; and
a partition factor $P_{R,E}$ is determined for each of said three regions, R.

15. The method of claim 9 wherein:
said borehole is a cased borehole; and
said borehole/formation measurement environment is assumed to comprise a constituent region, R, corresponding to each of the logging tool, the borehole fluid, the borehole casing, the cement annulus surrounding the casing, and the earth formation; and
a partition factor, $P_{R,E}$, is determined for each of said five regions, R.

16. The method of claim 9 further comprising recording said volume fractions as a function of depth within the borehole.

17. Apparatus for analyzing an earth formation traversed by a borehole, comprising:
a logging tool adapted for movement through the borehole;
neutron source means in said logging tool for irradiating the borehole/formation environment with pulses of high-energy neutrons;
detection means in said logging tool for detecting gamma rays which result from the capture of thermal neutrons by chemical elements of the borehole and formation constituents;
means for determining from said detected capture gamma rays elemental gamma ray yields, $Y_E$, indicative of the presence of specific chemical elements, E, in the borehole/formation measurement environment;
means for storing sensitivity factors, $S_{E,M}$, representative of the efficiency of detecting said chemical elements, E, in predetermined borehole and formation constituents, M;
means for deriving for each of predetermined constituent regions, R, in the borehole/formation measurement environment which contains a chemical element, E, of interest a partition factor, $P_{R,E}$, which is a function of the spatial and temporal effects of said region on said gamma rays; and
means for determining from said elemental gamma ray yields, $Y_E$, said sensitivity factors, $S_{E,M}$, and said partition factors, $P_{R,E}$, the volume fractions, $V_{M,R}$, of said constituents M in said borehole/formation regions R.

18. The apparatus of claim 17 wherein said partition factor, $P_{R,E}$, is determined by combining a first function of the spatial effects of said region R on said gamma rays and a second function of the temporal effects of said region R on said gamma rays.

19. The apparatus of claim 18 wherein said first function is representative of the spatial dependence of the thermal neutron flux distribution, $\phi_R$, within said region R and said second function is representative of the time dependence of the thermal neutron flux distribution, $\phi_R$, within said region R.

20. The apparatus of claim 18 wherein said partition-factor determining means comprises means for multiplying said first and second functions for each region, R, to provide said partition factor, $P_{R,E}$, for said region R.

21. The apparatus of claim 17 wherein:
said borehole is an open borehole; and
said borehole/formation measurement environment is assumed to comprise a constituent region, R, corresponding to each of the logging tool, the borehole fluid, and the earth formation; and
a partition factor $P_{R,E}$ is determined for each of said three regions, R.

22. The apparatus of claim 17 wherein:
said borehole is a cased borehole; and
said borehole/formation measurement environment is assumed to comprise a constituent region, R, corresponding to each of the logging tool, the borehole fluid, the borehole casing, the cement annulus surrounding the casing, and the earth formation; and
a partition factor, $P_{R,E}$, is determined for each of said five regions, R.

23. The apparatus of claim 17 further comprising means for recording said volume fractions as a function of depth within the borehole.

24. Apparatus for analyzing an earth formation traversed by a borehole from thermal neutron capture gamma rays detected within a borehole traversing the formation, comprising:
means for determining from said detected gamma rays elemental gamma ray yields, $Y_E$, indicative of the presence of specific chemical elements, E, in the borehole/formation measurement environment;
means for storing sensitivity factors, $S_{E,M}$, representative of the efficiency of detecting said chemical elements, E, in predetermined borehole and formation constituents, M;
means for deriving for each of predetermined constituent regions, R, in the borehole/formation measurement environment which contains a chemical element, E, of interest a partition factor, $P_{R,E}$, which is a function of the spatial and temporal effects of said region on said gamma rays; and
means for determining from said elemental gamma ray yields, $Y_E$, said sensitivity factors, $S_{E,M}$, and said partition factors, $P_{R,E}$, the volume fractions, $V_{M,R}$, of said constituents M in said borehole/formation regions R.

25. The apparatus of claim 24 wherein said partition factor, $P_{R,E}$, is determined by combining a first function of the spatial effects of said region R on said gamma rays and a second function of the temporal effects of said region R on said gamma rays.

26. The apparatus of claim 25 wherein said first function is representative of the spatial dependence of the thermal neutron flux distribution, $\phi_R$, within said region R and said second function is representative of the time dependence of the thermal neutron flux distribution, $\phi_R$, within said region R.

27. The apparatus of claim 25 wherein said partition factor determining means comprises means for multiplying said first and second functions for each region, R, to provide said partition factor, $P_{R,E}$, for said region R.

28. The apparatus of claim 24 wherein:
said borehole is an open borehole; and
said borehole/formation measurement environment is assumed to comprise a constituent region, R, corresppnding to each of the logging tool, the borehole fluid, and the earth formation; and
a partition factor $P_{R,E}$ is determined for each of said three regions, R.

29. The apparatus of claim 24 wherein:
said borehole is a cased borehole; and
said borehole/formation measurement environment is assumed to comprise a constituent region, R, corresponding to each of the logging tool, the borehole fluid, the borehole casing, the cement annulus surrounding the casing, and the earth formation; and
a partition factor, $P_{R,E}$, is determined for each of said five regions, R.

30. The apparatus of claim 24 further comprising means for recording said volume fractions as a function of depth within the borehole.

* * * * *

UNITED STATES PATENT AND TRADEMARK OFFICE
CERTIFICATE OF CORRECTION

PATENT NO. : 4,661,701
DATED : April 28, 1987
INVENTOR(S) : James A. Grau

It is certified that error appears in the above-identified patent and that said Letters Patent is hereby corrected as shown below:

Col. 2, line 8, after "invention" insert --is--;
Col. 8, line 32, "probablity" should read --probability--;
Col. 8, lines 50-51, "partititon" should read --partition--;
Col. 12, line 33, "partititon" should read --partition--;
Col. 15, line 16, "with" should read --within--;
Col. 18, line 1, "resppnding" should read --responding--.

Signed and Sealed this

Twenty-second Day of December, 1987

Attest:

DONALD J. QUIGG

Attesting Officer

Commissioner of Patents and Trademarks